United States Patent
Heit et al.

(10) Patent No.: US 8,752,879 B1
(45) Date of Patent: Jun. 17, 2014

(54) VEHICLE WITH PIVOTING SEAT BACK AND STOPPER MEMBER

(71) Applicant: Honda Motor Co., Ltd., Tokyo (JP)

(72) Inventors: Casey Heit, Marysville, OH (US); Tsuyoshi Kumasaka, Dublin, OH (US); Yoshiyuki Sato, Dublin, OH (US); Eric B. Stevens, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/760,272

(22) Filed: Feb. 6, 2013

(51) Int. Cl.
*B60N 2/30* (2006.01)
*B60N 2/20* (2006.01)

(52) U.S. Cl.
CPC .................................... *B60N 2/20* (2013.01)
USPC .................. 296/67; 296/65.16; 296/39.1

(58) Field of Classification Search
CPC ...... B60N 2/30; B60N 2/3011; B60N 2/0232; B60R 13/01; B60J 5/04; B60P 3/42; B62D 33/08
USPC .................. 296/67, 65.16, 39.1, 39.2, 10
See application file for complete search history.

(56) References Cited

U.S. PATENT DOCUMENTS

| | | | |
|---|---|---|---|
| 4,005,898 A | 2/1977 | Way | |
| 4,366,978 A | 1/1983 | Hamatani | |
| 4,750,778 A | 6/1988 | Hoban | |
| 4,911,493 A | 3/1990 | Muirhead | |
| 5,029,928 A | 7/1991 | Huber | |
| 5,037,154 A | 8/1991 | Senba et al. | |
| 5,368,354 A | 11/1994 | Martin | |
| 5,383,707 A | 1/1995 | Osenkowski et al. | |
| 5,398,985 A | 3/1995 | Robinson | |
| 5,505,513 A | 4/1996 | Carsner | |
| 5,741,046 A | 4/1998 | Leuchtmann et al. | |
| 5,979,964 A | 11/1999 | Ban et al. | |
| 5,984,397 A | 11/1999 | Dawson et al. | |
| 6,158,800 A | 12/2000 | Tsuge et al. | |
| 6,237,981 B1 | 5/2001 | Selleck | |
| 6,481,772 B1 | 11/2002 | Tenn | |
| 6,540,272 B2 | 4/2003 | Spurr | |
| 6,557,882 B2 | 5/2003 | Harrington | |
| 6,655,738 B2 | 12/2003 | Kammerer | |
| 6,733,078 B1 | 5/2004 | Zelmanov | |
| 6,905,159 B1 | 6/2005 | Saito et al. | |
| 6,908,137 B2 | 6/2005 | Doxey et al. | |

(Continued)

OTHER PUBLICATIONS

U.S. Appl. No. 13/760,257; Titled: Vehicle with Pivoting Seat Back and Latch Assembly; filed: Feb. 6, 2013; Inventors: Casey Heit et al., in its entirety.

(Continued)

*Primary Examiner* — Dennis H Pedder
*Assistant Examiner* — Beverly Becker
(74) *Attorney, Agent, or Firm* — Ulmer & Berne LLP (57) ABSTRACT

A vehicle includes a frame, a side wall, a door, a seat, and a stopper member. The side wall is coupled with the frame. The door is pivotally coupled with the side wall and is pivotable between a closed position and an opened position. The seat includes a seat back that is pivotable about a pivot axis between a stowed position and a deployed position. The stopper member is coupled with the door and extends outwardly from the door. The stopper member is configured to overlie at least a portion of the seat back when the seat back is in the stowed position with the door in the closed position.

22 Claims, 9 Drawing Sheets

(56) References Cited

U.S. PATENT DOCUMENTS

| | | |
|---|---|---|
| 6,945,585 B1 | 9/2005 | Liu et al. |
| 6,994,388 B2 | 2/2006 | Saito et al. |
| 7,021,689 B1 | 4/2006 | Weisbeck, III |
| 7,152,926 B2 | 12/2006 | Wrobel |
| 7,188,906 B2 | 3/2007 | Christoffel et al. |
| 7,416,238 B2 | 8/2008 | Houston |
| 7,636,985 B2 * | 12/2009 | Greenbank .................. 16/389 |
| 7,658,430 B2 | 2/2010 | Zielinski et al. |
| 7,717,495 B2 | 5/2010 | Leonard et al. |
| 7,735,896 B2 | 6/2010 | Kubota |
| 7,762,621 B2 | 7/2010 | Duller |
| 7,874,606 B2 | 1/2011 | Yamamura et al. |
| 8,002,331 B2 | 8/2011 | Bowers |
| 8,075,040 B2 | 12/2011 | Arnold |
| 8,196,990 B2 | 6/2012 | Aebker et al. |
| 8,313,133 B2 | 11/2012 | King |
| 8,328,261 B2 | 12/2012 | Kanazawa et al. |
| 8,348,322 B2 | 1/2013 | King |
| 8,353,552 B2 | 1/2013 | Scheurer, II et al. |
| 2009/0127886 A1 | 5/2009 | Stortzum |
| 2012/0025557 A1 | 2/2012 | Lindsay et al. |
| 2012/0161468 A1 | 6/2012 | Tsumiyama et al. |
| 2012/0193931 A1 | 8/2012 | King |
| 2012/0193932 A1 | 8/2012 | King |

OTHER PUBLICATIONS

Becker, Beverly J., Non-Final Office Action; Notification Date of Dec. 9, 2013; U.S. Appl. 13/760,257; Titled: Vehicle with Pivoting Seat Back and Latch Assembly; Filed: Feb. 6, 2013; Inventor: Casey Heit et al.; in its entirety.

* cited by examiner

VEHICLE WITH PIVOTING SEAT BACK AND STOPPER MEMBER

TECHNICAL FIELD

A vehicle includes a frame and a rear seat. The rear seat has a seat back that is pivotable between a stowed position and a deployed position.

BACKGROUND

Certain conventional vehicles include a utility bed which is movable between a hauling position and a dumping position. Such a utility bed is often referred to as a "dump bed" and is suitable to selectively facilitate transportation of cargo.

SUMMARY

In accordance with one embodiment, a vehicle comprises a vehicular frame and a utility bed. The utility bed is coupled with the vehicular frame and comprises a bed frame, a door, a seat, and a stopper member. The side wall is coupled with the bed frame. The door is pivotally coupled with the side wall and is pivotable between a closed position and an opened position. The seat comprises a seat bottom and a seat back. The seat bottom is coupled with the bed frame. The seat back is pivotally coupled with respect to the bed frame and is pivotable about a pivot axis between a stowed position and a deployed position. The stopper member is coupled with the door and extends laterally inwardly from the door. The stopper member is configured to overlie a portion of the seat back when the seat back is in the stowed position with the door in the closed position.

In accordance with another embodiment, a vehicle comprises a frame, a side wall, a door, a seat, and a stopper member. The side wall is coupled with the frame. The door is pivotally coupled with the side wall and is pivotable between a closed position and an opened position. The seat comprises a seat back that is pivotally coupled with the frame and is pivotable about a pivot axis between a stowed position and a deployed position. The stopper member is coupled with the door and extends outwardly from the door. The stopper member is configured to overlie at least a portion of the seat back when the seat back is in the stowed position with the door in the closed position.

BRIEF DESCRIPTION OF THE DRAWINGS

Various embodiments will become better understood with regard to the following description, appended claims and accompanying drawings wherein:

DETAILED DESCRIPTION

Embodiments are hereinafter described in detail in connection with the views of FIGS. 1-9, wherein like numbers indicate the same or corresponding elements throughout the views. A utility vehicle includes a utility bed which can be used to facilitate hauling of cargo by the utility vehicle. In one embodiment, the utility vehicle can be a dump-type utility vehicle having a utility bed that can facilitate selective dumping of cargo from the utility bed. A dump-type utility vehicle can comprise a light utility vehicle, such as the utility vehicle 10 shown in FIGS. 1-9. In other embodiments, a dump-type utility vehicle can comprise any of a variety of other types of utility vehicles having a utility bed capable of dumping (e.g., a dump bed) such as, for example, a pickup truck, a dump truck, an all terrain vehicle ("ATV"), and a golf cart, for example. In another embodiment, the utility vehicle can include a non-dump type utility vehicle having a utility bed that is rigidly fixed to the utility vehicle's frame (e.g., a non-dumpable bed). In yet another embodiment, the utility vehicle can include a trailer.

Figure 1:
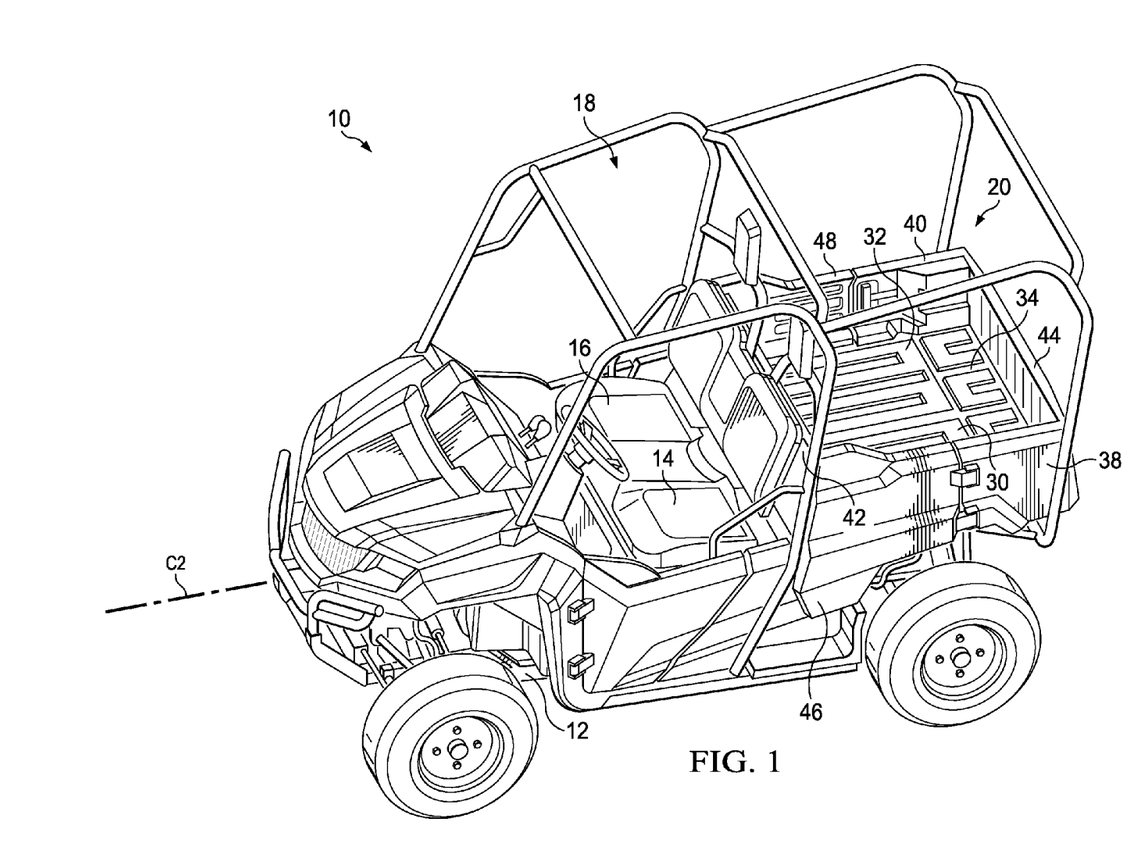
FIG. 1 is a front left side perspective view depicting a vehicle having a utility bed that includes left and right rear seat backs in respective stowed positions, in accordance with one embodiment.

Referring to FIG. 1, the utility vehicle 10 can include a vehicular frame 12. The vehicular frame 12 can include any of a variety of structural and/or decorative rails, panels, and/or other components which are typically, although not necessarily, formed from metal (e.g., steel and/or aluminum). A left front seat 14 and a right front seat 16 can each be supported by the vehicular frame 12 and can facilitate support of occupants within a passenger compartment 18. The utility vehicle 10 can also include a utility bed 20 which is coupled with the vehicular frame 12, either directly or indirectly, and such as through use of a hinge assembly (not shown). The hinge assembly can facilitate pivotable movement of the utility bed 20 with respect to the vehicular frame 12, and between a hauling position (shown in FIG. 1) and a dumping position (FIG. 9).

Figure 2:
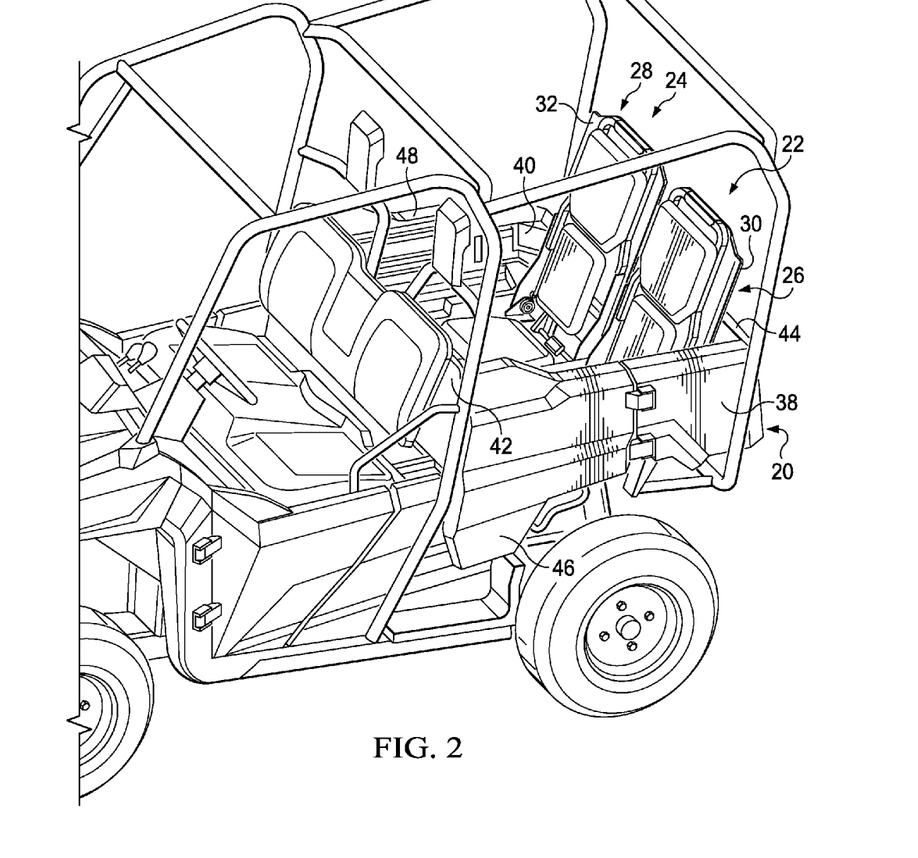
FIG. 2 is a front left side perspective view depicting the vehicle of FIG. 1 but with the left and right rear seat backs in respective deployed positions.

As illustrated in FIG. 2, the utility bed 20 can include a left rear seat 22 and a right rear seat 24 that can include a left seat back 26 and a right seat back 28, respectively. The left and right seat backs 26, 28 can each be pivotally coupled with respect to a bed frame 45 of the utility bed 20. In one embodiment, the left and right seat backs 26, 28 can be pivotally coupled to the bed frame 45, either directly, or indirectly (e.g., through attachment to left and right seat bottoms 36, 37 which can in turn be attached directly to the bed frame 45). In other embodiments, left and right seat backs can be pivotally coupled to another portion of the utility bed or vehicle. Each of the left and right seat backs 26, 28 can be selectively and independently pivotable about a pivot axis (A1 in FIG. 3) between a stowed position (FIG. 1) and a deployed position (FIG. 2). When the left and right seat backs 26, 28 are in their stowed positions, their respective cover panels 30, 32 can facilitate support of cargo within the utility bed 20. For example, the utility bed 20 is shown to comprise a bed floor 34 adjacent to the left and right rear seats 22, 24. When the left and right seat backs 26, 28 are in their respective stowed positions, the left and right cover panels 30, 32 can cooperate with the bed floor 34 to define a cargo support surface for the utility bed 20. When the left and right seat backs 26, 28 are in their deployed positions, the left and right seat backs 26, 28 can cooperate with the respective left and right seat bottoms 36, 37 (FIG. 3) to facilitate support of passengers behind the left front seat 14 and the right front seat 16, respectively. The left and right seat bottoms 36, 37 can include respective cushions for providing underlying support to a seated passenger.

The utility bed 20 is shown in FIGS. 1-2 to include a left side wall 38 and a right side wall 40 extending generally perpendicularly from the bed floor 34 or locations adjacent to the bed floor 34. The utility bed 20 is also shown to include a front wall 42 and a tailgate 44. The tailgate 44 can be pivotally coupled with respect to the bed floor 34. When the utility bed 20 is in the hauling position (shown in FIG. 1), the left side wall 38, the right side wall 40, and the front wall 42 can cooperate with the bed floor 34 to retain cargo within the utility bed 20. The tailgate 44, when closed (as shown in FIGS. 1 and 2), can also cooperate with the left side wall 38, the right side wall 40, and the bed floor 34 to retain cargo within the utility bed 20. It will be appreciated that the tailgate 44 can be selectively opened to facilitate loading of the utility bed 20 and/or to allow cargo (e.g., dirt) to pour from the utility bed 20 when the utility bed 20 is in a dumping position (FIG. 9). In another embodiment, it will be appreciated that a rear wall can be provided in lieu of a tailgate, with the rear wall being rigidly affixed with respect to a bed floor of a utility bed such that it might not be capable of being selectively opened by an operator. In yet another alternative embodiment, it will be appreciated that one or more side walls (e.g., 38 and/or 40) of a utility bed might be capable of being selectively opened (e.g., like tailgate 44) by an operator. In still another alternative embodiment, it will be appreciated that a utility bed might not include any tailgate and/or side walls and might, for example, comprise a flat-bed type configuration.

Figure 9:
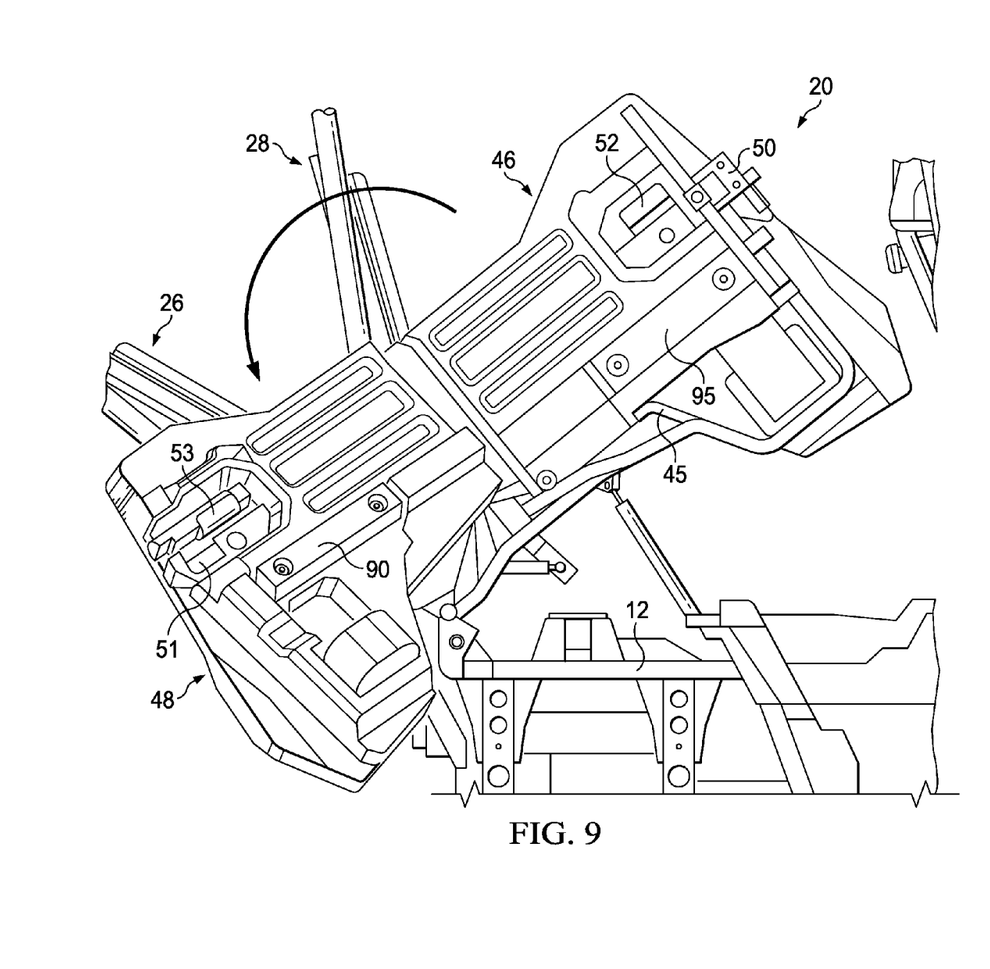
FIG. 9 is an enlarged right side elevational view generally depicting the utility vehicle of FIG. 1, but wherein the utility bed is shown to be in a dumping position, and wherein a rear right door is shown to be in an opened position, and wherein the left and right rear seat backs are shown to be in deployed and intermediate positions, respectively.

As illustrated in FIG. 9, the utility bed 20 can include the bed frame 45 that can be configured to provide underlying and structural support for certain components of the utility bed 20. The bed frame 45 can comprise a tubular frame structure that extends along a perimeter and/or underneath the bed floor 34 and provides underlying support for the bed floor 34, the left and right side walls 38, 40, and/or the front wall 42.

The utility bed 20 is also shown in FIGS. 1-2 to include respective left and right doors 46, 48 which are each pivotable between a closed position (shown in FIGS. 1 and 2) and an opened position (shown in FIG. 9 with respect to the right door 48). When in the closed position, each of the left and right doors 46, 48 can cooperate with the respective left and right side walls 38, 40, the front wall 42, and the bed floor 34 to retain cargo within the utility bed 20. When the left and right doors 46, 48 are moved to the respective opened positions, a passenger can be permitted ingress/egress to/from the left and right rear seats 22, 24.

In one embodiment, the left and right doors 46, 48 can comprise rear-hinged doors that are pivotally attached to the left and right side walls 38, 40, respectively, such that the left and right doors 46, 48 can be selectively opened towards a rear of the utility bed 20. Opening the left and right doors 46, 48 towards the rear of the utility bed 20 can permit more direct access to the left and right rear seats 22, 24 than might be otherwise be available with front-hinged doors. It will be appreciated, however, that in certain alternative embodiments, the left and right doors 46, 48 can instead be front-hinged doors or any of a variety of suitable alternate door arrangements.

Each of the left and right doors 46, 48 can include respective left and right door latches 50, 51 (FIG. 9) that can selectively interact with the front wall 42 to facilitate releasable coupling of the left and right doors 46, 48 in their closed positions. The latches 50, 51 can be selectively activated through operation of a respective door handle 52, 53 (FIG. 9) to facilitate opening of the left and right doors 46, 48. In one embodiment, a seal (not shown) can be provided along the perimeter of each of the left and right doors 46, 48. Each seal can facilitate selective sealing of the interaction between the door (e.g., 46, 48) and the adjacent side wall (e.g., 38, 40).

Figure 3:
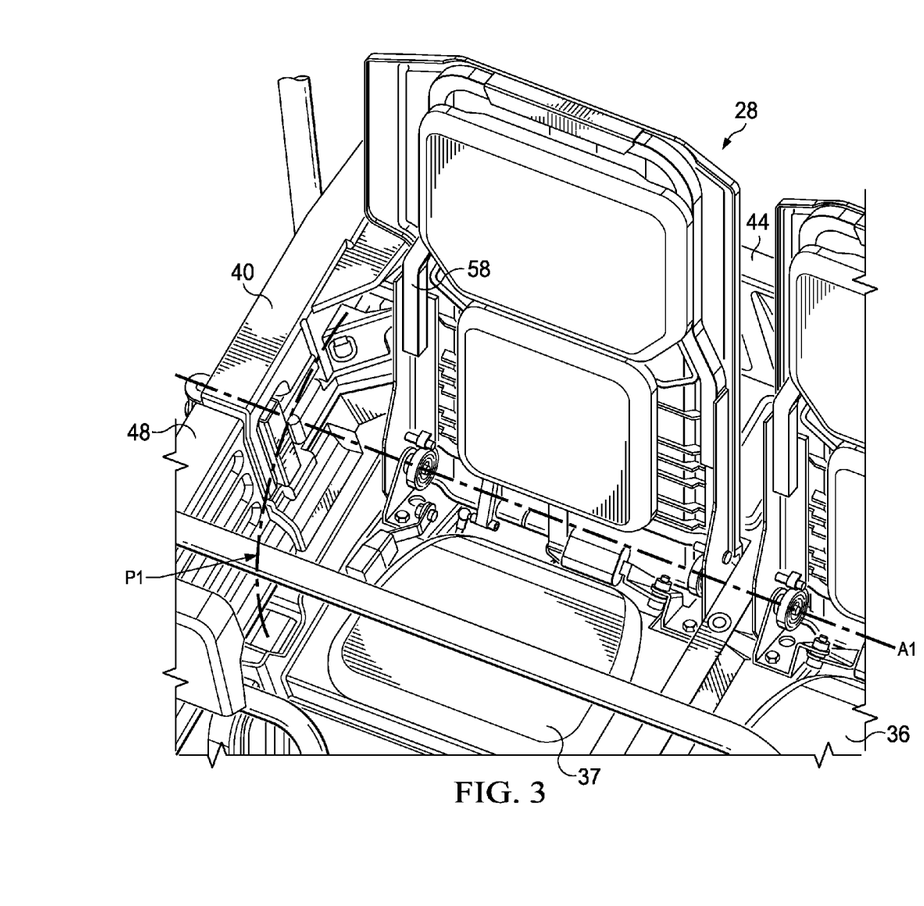
FIG. 3 is an enlarged front perspective view depicting a portion of the vehicle of FIG. 2, including the right rear seat.
Figure 4:
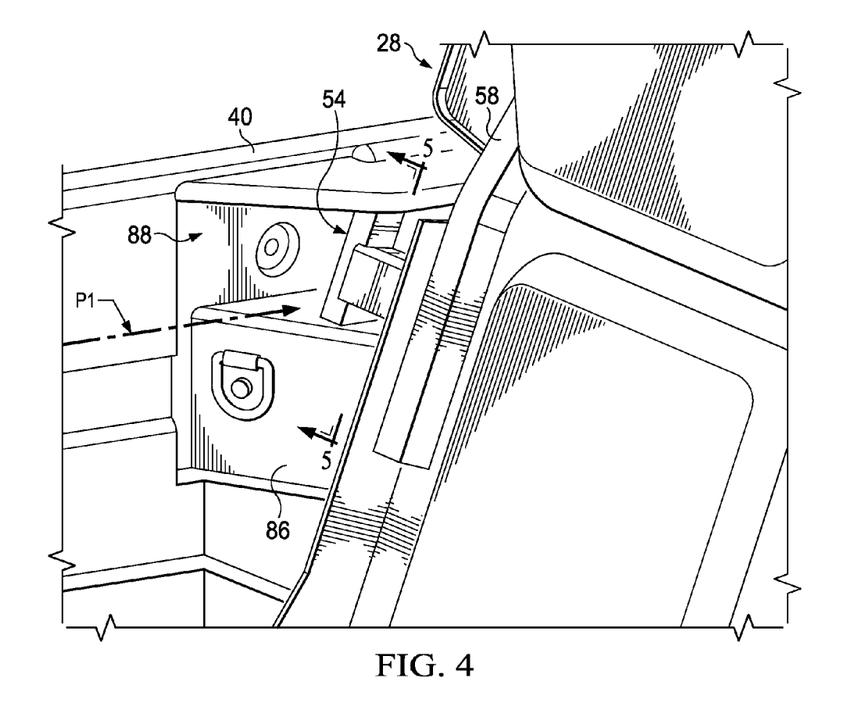
FIG. 4 is an enlarged view depicting a portion of the arrangement of FIG. 3
Figure 5:
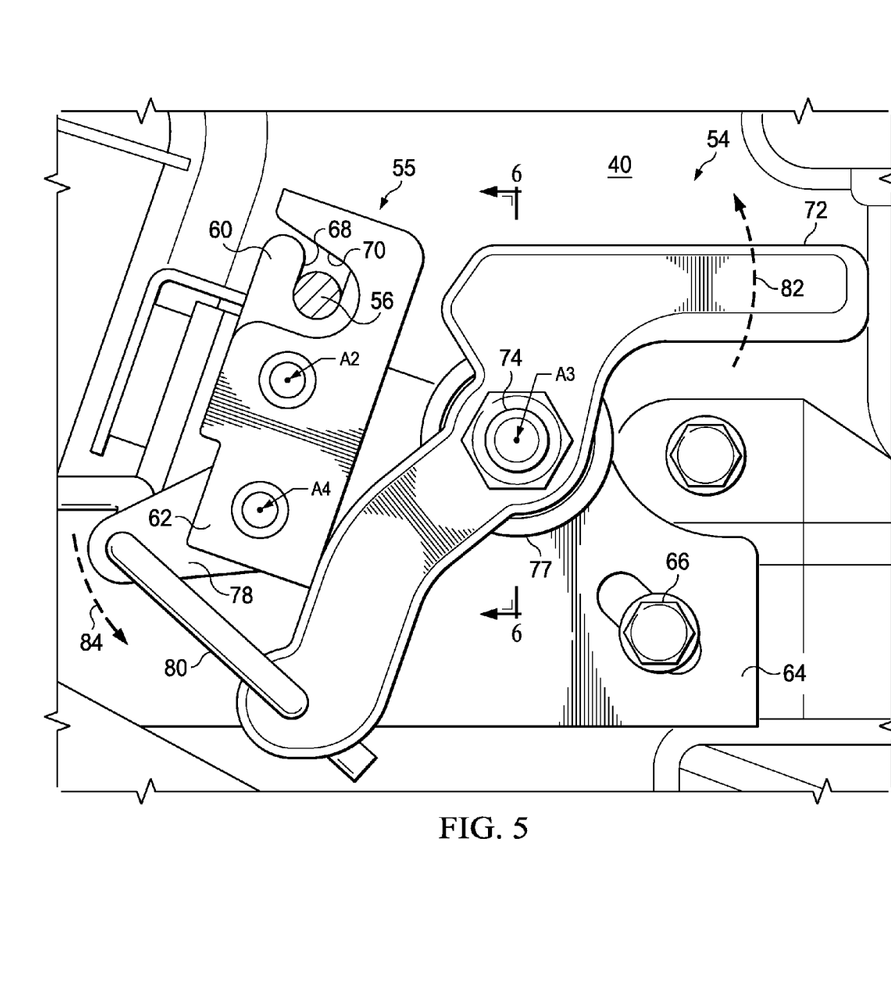
FIG. 5 is a cross-sectional view taken along the line 5-5 in FIG. 4.

Referring now to FIGS. 3-5, the utility bed 20 can include a right latch assembly 54 that is coupled with the right side wall 40. A striker member 56 can be rigidly coupled with the right seat back 28. The striker member 56 is shown to be coupled with an upright frame member 58 of the right seat back 28 such that the striker member 56 extends laterally outwardly from the upright frame member 58, i.e., away from the upright frame member 58 and towards the right side wall 40. When the right seat back 28 is pivoted to the deployed position, the right latch assembly 54 can selectively engage the striker member 56 to secure the right seat back 28 in the deployed position.

As illustrated in FIG. 5, the right latch assembly 54 can include a catch assembly 55 having a catch member 60 and a base member 62 that can cooperate to facilitate selective engagement of the striker 56. The base member 62 can be rigidly attached to a bracket 64 that is secured to the right side wall 40 with bolts (e.g., 66). The catch member 60 can be pivotally coupled to the base member 62 and can be pivotable about an axis A2 with respect to the base member 62. The catch member 60 can be pivotable between a grasping position (shown in FIG. 5) and a released position (not shown) to facilitate selective engagement of the striker member 56 and thus selective retention of the right seat back 28 in the deployed position.

As illustrated in FIG. 5, the catch member 60 and the base member 62 can define respective slots 68, 70. When the right seat back 28 is in the deployed position, the striker member 56 can extend at least partially into each of the slots 68, 70. When the catch member 60 is in the grasping position, the slot 68 can face upwardly such that it is blocked by the base member 62 thereby securing the striker member 56, and thus the right seat back 28, with respect to the right latch assembly 54, as shown in FIG. 5. When the catch member 60 is in the released position (not shown), the slot 68 can face away from the base member 62 (e.g., the slots 68, 70 are substantially aligned) thereby permitting the striker member 56, and thus the right seat back 28, to move away from right latch assembly 54.

Figure 6:
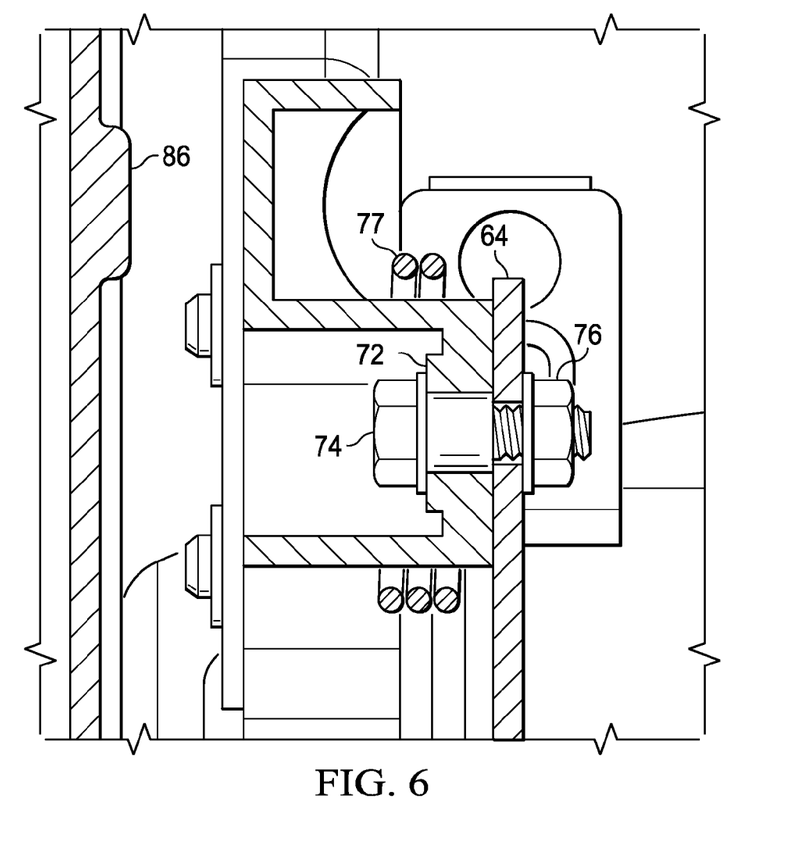
FIG. 6 is a cross-sectional view taken along the line 6-6 in FIG. 5.

The right latch assembly 54 can include an actuator 72 that is configured to facilitate selective manual releasing of the right seat back 28 from the deployed position, under force by an operator's hand or digit thereof directly or indirectly on the actuator 72. The actuator 72 can be pivotally coupled with the right side wall 40 and pivotable with respect to the right side wall 40 about an axis A3. As illustrated in FIG. 6, the actuator 72 can be pivotally coupled to the bracket 64 with a flange bolt 74 and a nut 76. A coil spring 77 can be coupled with the actuator 72 and configured to bias the actuator 72 into a released position (shown in FIG. 5). As illustrated in FIG. 5, the actuator 72 can be coupled to an arm member 78 of the catch assembly 55 by a link 80. The arm member 78 can be pivotally coupled with the base member 62 and pivotable with respect to the base member 62 about an axis A4. The respective axes A2, A3, A4 of the catch member 60, the actuator 72, and the arm member 78, respectively, can be substantially parallel. And, in one embodiment, as illustrated in FIG. 5, the catch member 60, the actuator 72 and the arm member 78 can be spaced from each other such that their respective axes A2, A3, A4 are non-coaxial.

In one embodiment, the arm member 78 can include one or more detents (not shown) to hold the catch member 60 in the grasping position. When the actuator 72 pivots from the released position to the actuated position (in direction 82 shown in FIG. 5), the arm member 78 can move to release the catch member 60, so the catch member 60 can move to the released position. The catch member 60 can be moved back to the grasping position by contact with the striker member 56 when the right door 48 is closed.

When the actuator 72 is pivoted into an actuated position (e.g., in the direction of arrow 82), the arm member 78 can correspondingly pivot in the same direction (e.g., in the direction of arrow 84) which can pivot the catch member 60 into the released position. When the actuator 72 is released, the coil spring 77 (FIG. 5) can facilitate automatic returning of the actuator 72 and arm member 78 to their respective released positions, as shown in FIG. 5.

The catch member 60 can comprise a one-way latch that is configured to be retained in the unlatched position when actuated by the actuator 72. As such, once the actuator 72 has been actuated to unlatch the catch member 60, subsequent actuations of the actuator 72 might not cause the catch member 60 to pivot. With the catch member 60 held in the unlatched position, the right seat back 28 can be free to be pivoted out of the deployed position. Once the right seat back 28 is again returned to the deployed position and the striker member 56 contacts the catch member 60 with enough force, the catch member 60 can automatically pivot into the latching position to secure the right seat back 28 with respect to the right latch assembly 54.

It will be appreciated that the striker member 56 can be any of a variety of different types of rigid members which are formed from any of a variety of materials such as steel or carbon-fiber, for example. It will also be appreciated that a striker member can be attached at any of a variety of seat back locations for cooperation with a latch assembly.

Referring now to FIGS. 4 and 6, the utility bed 20 is shown to include a cover panel 86. The cover panel 86 can be coupled with other portions of the right side wall 40 and configured to at least partially overlie the right latch assembly 54. In one embodiment, the cover panel 86 can overlie substantially the entire right latch assembly 54. In such an embodiment, the right latch assembly 54 can be substantially concealed from plain sight which can contribute to the overall aesthetics of the utility vehicle 10.

As illustrated in FIG. 4, the cover panel 86 can define an arcuate channel 88 adjacent to the right latch assembly 54. As illustrated in FIG. 3, when the right seat back 28 is pivoted between the stowed position and the deployed position, the striker member 56 can move along a travel path P1. The arcuate channel 88 can define at least a portion of the travel path P1 of the striker member 56 such that the striker member 56 can pass through the arcuate channel 88 and avoid contact with adjacent portions of the right side wall 40 when the right seat back 28 is moved into and out of the deployed position.

It will be appreciated that a left latch assembly (not shown) can be provided that can be similar in many respects to the right latch assembly 54, but instead disposed upon a left side of the utility bed 20 for selectively engaging a striker member on the left seat back 26 of the left rear seat 22. It will also be appreciated that any of a variety of suitable alternative latching arrangements can be provided for selectively engaging a seat mounted striker member. It will also be appreciated that although the embodiment of FIGS. 1-6 illustrates the right latch assembly 54 located more proximate to the tailgate 44 than the front wall 42, latch assemblies can be provided on a utility bed in any of a variety of suitable alternative arrangements.

Figure 7:
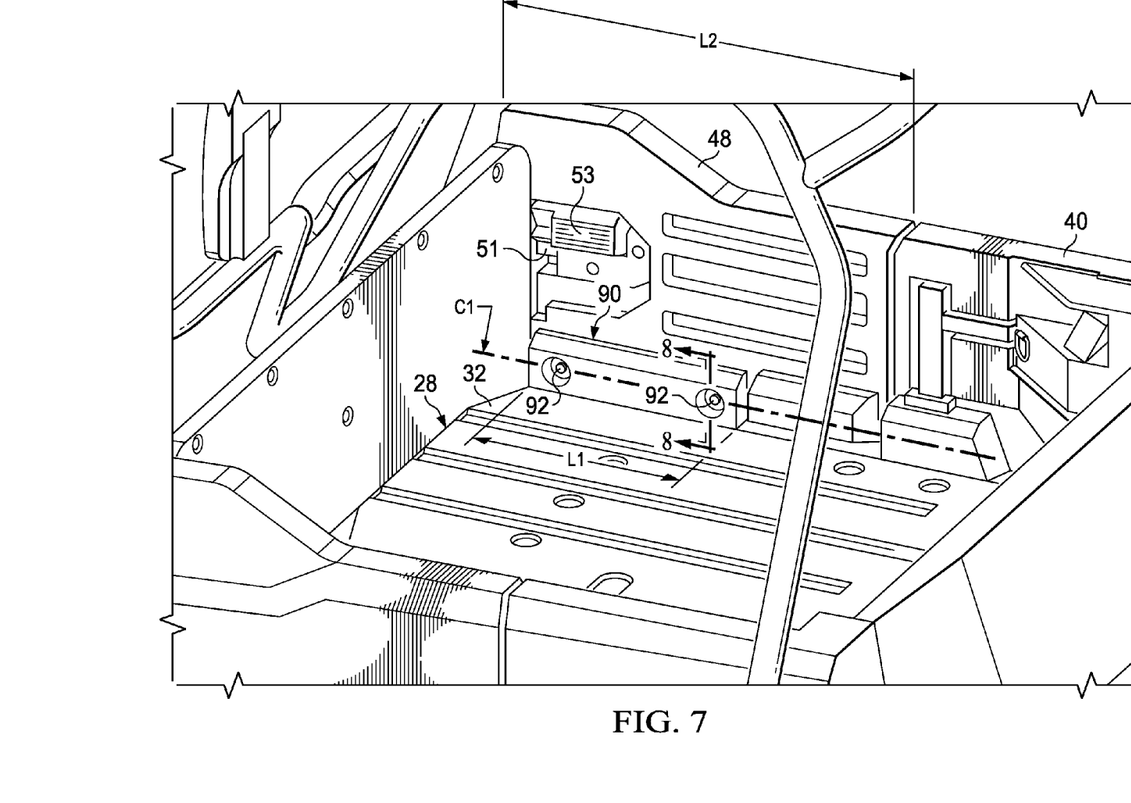
FIG. 7 is an enlarged rear perspective view depicting a portion of the vehicle of FIG. 1.
Figure 8:
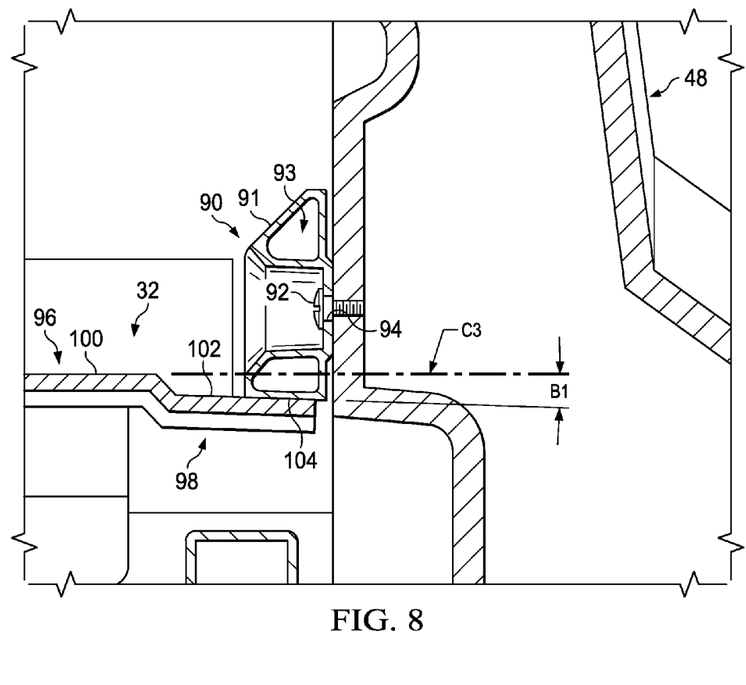
FIG. 8 is a cross-sectional view taken along the line 8-8 in FIG. 7.

The utility bed 20 can include a stopper member 90 that is coupled with the right door 48, and that can extend laterally inwardly from the right door 48, as shown in FIGS. 7-9. When the right seat back 28 is in the stowed position with the right door 48 in the closed position, the stopper member 90 can overlie at least a portion of the right seat back 28. The stopper member 90 can therefore prevent the right seat back 28 from being moved into the deployed position, such as during hauling of cargo, until the right door 48 has been moved to the opened position.

In one embodiment, as illustrated in FIG. 7, the stopper member 90 can comprise an elongate member having a longitudinal centerline C1. In one embodiment, the elongate member can comprise a substantially rectangular parallelepiped-shaped elongate member. However, it will be appreciated that the elongate member can comprise any of a variety of other suitable shapes and/or configurations. In one embodiment, the substantially rectangular parallelepiped-shaped elongate member can be formed as a hollow structure such as in a blow molding or injection molding process, for example, to have a wall 91 that defines one or more cavities (e.g., 93). In an alternative embodiment, the substantially rectangular parallelepiped-shaped elongate member can have a solid configuration. The stopper member 90 can be positioned such that the longitudinal centerline C1 is substantially parallel to a longitudinal centerline C2 (FIG. 1) of the utility vehicle 10. The stopper member 90 is shown to have a length L1. In one embodiment, as illustrated in FIG. 7, the length L1 can be about half of the overall length L2 of the right door 48. When the right cover panel 32 and the stopper member 90 are in contact, the force on the stopper member 90 can accordingly be distributed through the stopper member 90 to a significant portion of the right door 48.

The stopper member 90 can be releasably secured to the right door 48 with a pair of threaded fasteners (e.g., 92 shown in FIG. 8). The stopper member 90 can define a pair of apertures (e.g., 94 shown in FIG. 8) for receiving the threaded fasteners. In one embodiment, the apertures 94 can be vertically slotted which can permit the position of the stopper member 90 to be adjusted vertically (e.g., during installation of the stopper member 90) to ensure proper and consistent contact with the right cover panel 32. In another embodiment, the apertures 94 can additionally or alternatively be horizontally slotted which can permit the position of the stopper member 90 to be adjusted horizontally (e.g., during installation of the stopper member 90) to ensure proper placement relative to the front wall 42 and right side wall 40 when the right door 48 is closed.

In one embodiment, as shown in FIG. 8, the right cover panel 32 can include a central portion 96 and a recessed outer edge portion 98 that extends outwardly and downwardly from the central portion 96. The stopper 90 can be configured to extend laterally from the right door 48 enough to overlie at least a portion of the outer edge portion 98, without contacting the central portion 96. The central portion 96 is shown to include a first surface 100 and the recessed outer edge portion 98 is shown to include a second surface 102. The first surface 100 can define a lateral centerline C3 that is substantially parallel with the pivot axis A1 (FIG. 3) of the right seat back 28. The recessed outer edge portion 98 can be arranged with respect to the central portion 96 such that the second surface 102 is angled downwardly relative to the lateral centerline C3 at an angle B1. The stopper member 90 can include a lower surface 104 that is angled upwardly relative to the lateral centerline C3 about at a substantially equal angle as B1 such that the contact between the second surface 102 and the lower surface 104 is substantially uniform, thereby enhancing the overall aesthetics and mechanical fit and function of the utility bed 20.

Although in one embodiment, the stopper member 90 can be formed of a thermoplastic material, it will be appreciated that the stopper member 90 can be formed of any of a variety a suitable alternative materials, such as a metal alloy or an elastomeric material, for example. It will be appreciated that a stopper member (95 in FIG. 9) can be provided on the left side of the utility bed 20 that is similar in many respects to the stopper member 90 but is instead attached to the left door 46 and configured to selectively interact with the left seat back 26. In such an arrangement, the left seat back 26 can be similar in many respects to the right seat back 28.

It will also be appreciated that although the embodiment of FIGS. 1-9 illustrates forward facing rear seats, rear seats can be provided on a utility bed in any of a variety of suitable alternative arrangements. In one embodiment, left and right rear seats can comprise rearward facing seats. In such an embodiment, the left and right side walls may or may not include respective left and right side doors since the rear seats can be accessed from the rear of the utility vehicle.

Although the embodiments above have been described with respect to individual left and right rear seats, it will be appreciated that in other embodiments the utility bed can include more than two rear seats or less than two rear seats. In yet another embodiment, the utility bed can provide a bench-type rear seat.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
a vehicular frame; and
a utility bed coupled with the vehicular frame, the utility bed comprising:
a bed frame;
a side wall coupled with the bed frame;
a door pivotally coupled with the side wall and pivotable between a closed position and an opened position;
a seat comprising:
a seat bottom coupled with the bed frame; and
a seat back pivotally coupled with respect to the bed frame and pivotable about a pivot axis between a stowed position and a deployed position; and
a stopper member coupled with the door and extending laterally inwardly from the door, the stopper member being configured to overlie a portion of the seat back when the seat back is in the stowed position with the door in the closed position;
wherein the door is pivotable about a substantially vertical axis when the seat back is in the stowed position with the utility bed in a substantially horizontal position.

2. The vehicle of claim 1 wherein the stopper member comprises an elongate member that defines a centerline that is substantially parallel to a longitudinal centerline of the vehicle.

3. The vehicle of claim 2 wherein the seat back comprises a cover panel that includes a central portion and a recessed outer edge portion that extends outwardly from the central portion, and wherein the stopper member is configured to overlie at least a portion of the recessed outer edge portion when the seat back is in the stowed position with the door in the closed position.

4. The vehicle of claim 3 wherein the stopper member defines at least one slotted aperture that is configured to receive a fastener for releasably fastening the stopper member to the door.

5. The vehicle of claim 1 wherein the stopper member is configured to prevent pivoting of the seat back from the stowed position to the deployed position, when the seat back is in the stowed position with the door in the closed position.

6. The vehicle of claim 3 wherein the central portion includes a first surface, the recessed outer edge portion includes a second surface, the first surface defines a lateral centerline that is substantially parallel with the pivot axis, and the second surface is angled downwardly relative to the lateral centerline.

7. The vehicle of claim 6 wherein the stopper member comprises a lower surface that is angled upwardly with respect to the lateral centerline.

8. The vehicle of claim 7 wherein the magnitude of the angle of the second surface with respect to the lateral centerline is the substantially equal to the magnitude of the angle of the lower surface with respect to the lateral centerline.

9. The vehicle of claim 8 wherein the stopper member comprises a first length, and the door comprises a second length, and wherein the first length is about half of the second length.

10. The vehicle of claim 1 wherein the stopper member is substantially rectangular parallelepiped-shaped.

11. A vehicle comprising:
a frame;
a side wall coupled with the frame;
a door pivotally coupled with the side wall and pivotable between a closed position and an opened position;
a seat comprising a seat back pivotally coupled with the frame and pivotable about a pivot axis between a stowed position and a deployed position; and
a stopper member coupled with the door and extending outwardly from the door, the stopper member being configured to overlie at least a portion of the seat back only when the seat back is in the stowed position with the door in the closed position.

12. The vehicle of claim 11 wherein the stopper member comprises an elongate member that defines a centerline that is substantially parallel to a longitudinal centerline of the vehicle.

13. The vehicle of claim 12 wherein the seat back comprises a cover panel that includes a central portion and a recessed outer edge portion that extends outwardly from the central portion, and wherein the stopper member is configured to overlie at least a portion of the recessed outer edge portion when the seat back is in the stowed position with the door in the closed position.

14. The vehicle of claim 13 wherein the stopper member defines at least one slotted aperture that is configured to receive a fastener for releasably fastening the stopper member to the door.

15. The vehicle of claim 11 wherein the stopper member is configured to prevent pivoting of the seat back from the stowed position to the deployed position, when the seat back is in the stowed position with the door in the closed position.

16. The vehicle of claim 13 wherein the central portion includes a first surface, the recessed outer edge portion includes a second surface, the first surface defines a lateral centerline that is substantially parallel with the pivot axis, and the second surface is angled downwardly relative to the lateral centerline.

17. The vehicle of claim 16 wherein the stopper member comprises a lower surface that is angled downwardly with respect to the lateral centerline.

18. The vehicle of claim 17 wherein the angle of the second surface with respect to the lateral centerline is substantially equal to the angle of the lower surface with respect to the lateral centerline.

19. The vehicle of claim 18 wherein the stopper member comprises a first length, and the door comprises a second length, and wherein the first length is about half of the second length.

20. The vehicle of claim 11 wherein the stopper member is substantially rectangular parallelepiped-shaped.

21. The vehicle of claim 1 wherein the door is a rear-hinged door.

22. The vehicle of claim 11 wherein the door is a rear-hinged door.

* * * * *